INVENTOR.
HENRY R. STAFFORD.
BY

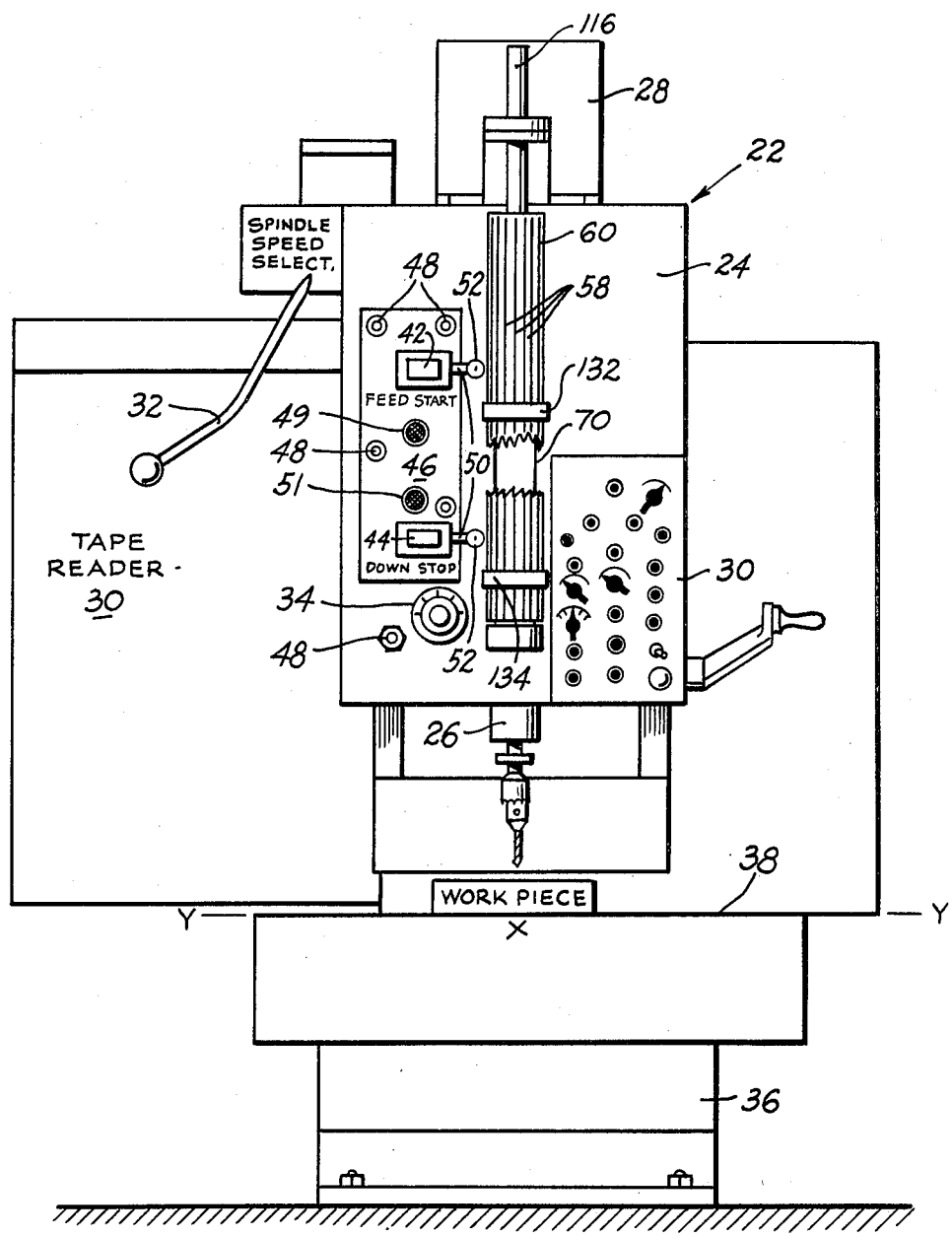

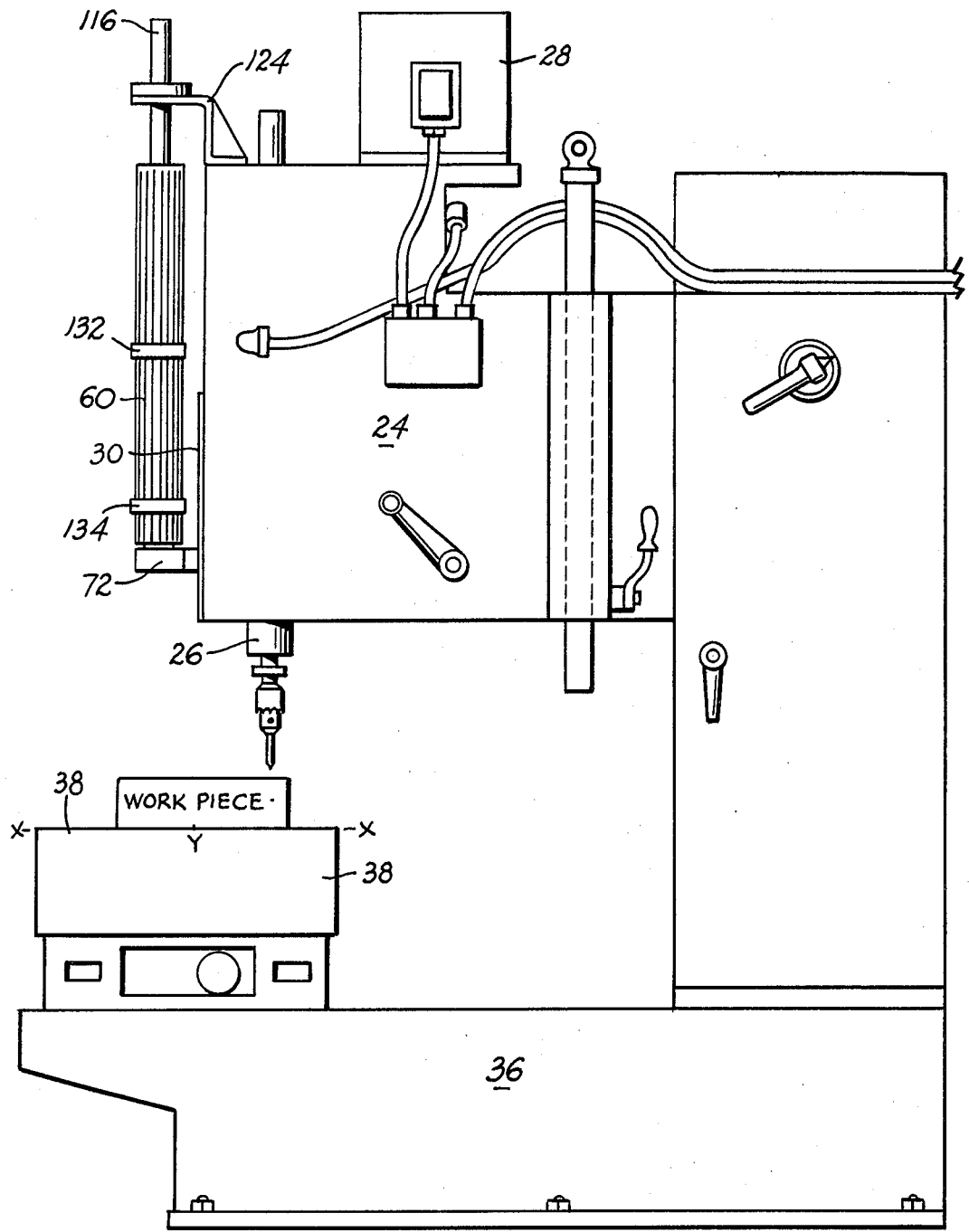

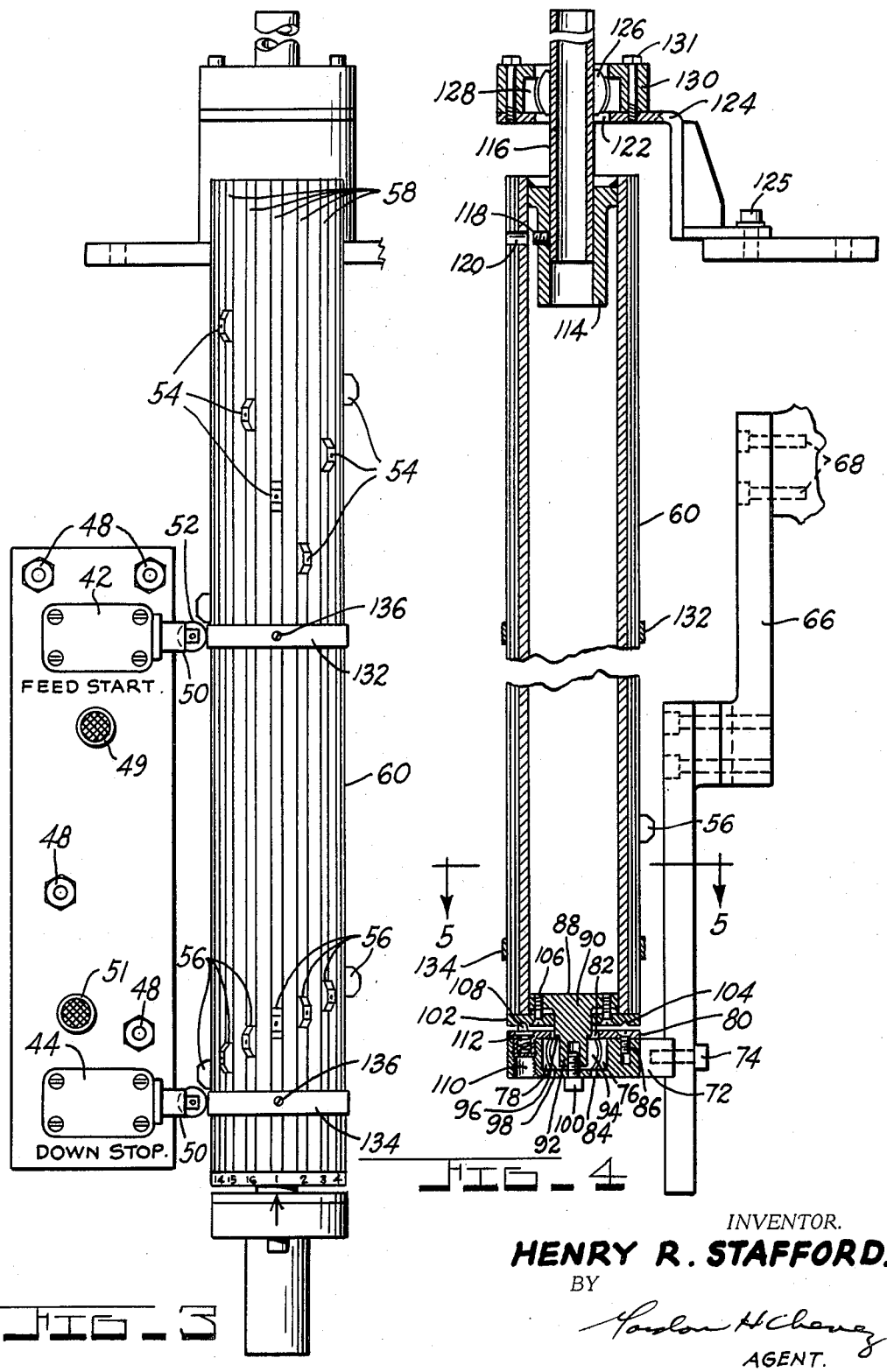

AGENT

United States Patent Office 3,478,624
Patented Nov. 18, 1969

3,478,624
INDEXABLE CONTROL MECHANISM
Henry R. Stafford, South Bend, Ind., assignor to The Bendix Corporation, a corporation of Delaware
Filed Apr. 20, 1967, Ser. No. 632,300
Int. Cl. B23b 49/00, 47/18
U.S. Cl. 77—32.1                    1 Claim

ABSTRACT OF THE DISCLOSURE

An indexable device having a plurality of adjustable stop abutments movable with a tool-carrying spindle of an automated machine tool and engageable with switch means for controlling the operation including travel distance of the tool-carrying spindle.

BACKGROUND OF THE INVENTION

This invention relates to an indexable multiple adjustable stop abutment means for controlling the traverse down to feed position and subsequent travel distance of a tool carrying spindle in relation to a work piece carried by a work piece supporting table movable to selected positions to permit a plurality of different machining operations to be performed thereon.

This invention is particularly adapted for use with a conventional upright drill press having a rotatable tool carrying spindle movable axially toward and away from a work piece mounted on a movable support capable of being actuated to different positions to thereby position the work piece accordingly relative to the tool carrying spindle and permit different machining operations to be carried out on different portions of the work piece.

SUMMARY OF THE INVENTION

The present invention may be applied to various conventional machine tools as well as will be recognized by those persons skilled in the art. However, in particular, the present invention is adapted for use with a Giddings and Lewis "Numeri-Mite" upright drill which is automated by conventional control means such as a Bendix Dynapoint tape reader which provides numerical control intelligence for actuating the work supporting table of the drill press in mutually perpendicular X and Y axes as well as the tool carrying spindle movable relative thereto.

It has been found that the abovementioned tape controlled drill press is not entirely satisfactory due to control restrictions on the spindle operation which is limited to a fixed traverse down to feed start range of movement as well as a fixed stop for limiting the downward travel of the spindle. As a result of the abovementioned control limitations on the spindle, special tools of different lengths are required in multiple tool setups for a given work piece wherein a plurality of different machining operations such as drilling, tapping or the like are performed. Furthermore, such control limitations render automatic cycling of the spindle impractical.

The present invention provides a plurality of adjustable abutments which are carried on an indexable drum carried by a rotatably and axially movable tool spindle for axial movement therewith which abutments may be simply and easily adjusted to selected positions whereby a predetermined pair of the abutments coact with switch means which, in turn, control the spindle feed start and stop operation in accordance with the machining operation to be performed by a given tool carried by the spindle. The present invention permits the use of standard sized tools thereby eliminating the aforementioned relatively high cost of special tooling. The present invention reduces the setup time for multiple tool setups as well as reducing machine cycle time thereby increasing the efficiency of the automated drill press as will be recognized by those skilled in the art.

BRIEF DESCRIPTION OF THE DRAWINGS

FIGURE 1 represents a schematic plan view of a conventional tape controlled automated upright drill press embodying the present invention;

FIGURE 2 represents a side view of the structure of FIGURE 1;

FIGURE 3 represents an enlarged view of the present invention shown removed from the upright press of FIGURE 1;

FIGURE 4 represents a side view of the structure of FIGURE 3;

DESCRIPTION OF THE PREFERRED EMBODIMENT

Figure 6:
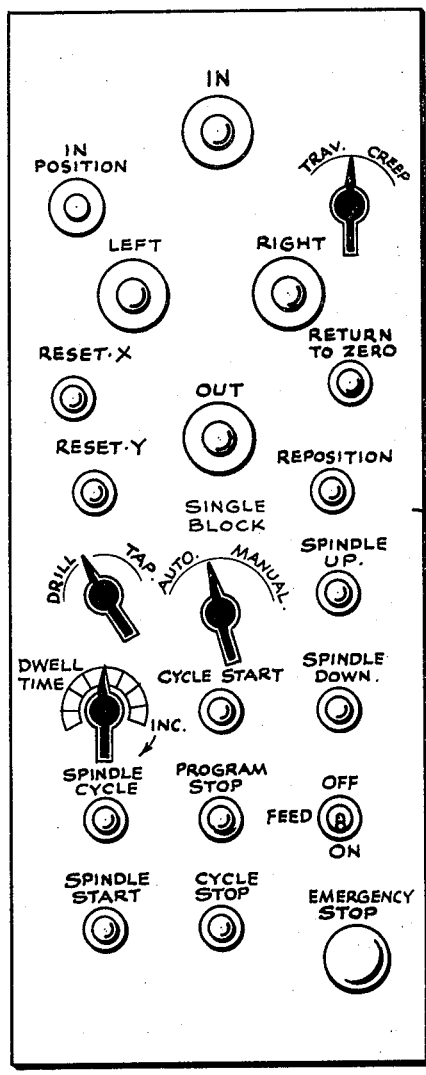
FIGURE 6 is an enlarged view of the control panel shown removed from the structure of FIGURE 1.
Figure 5:
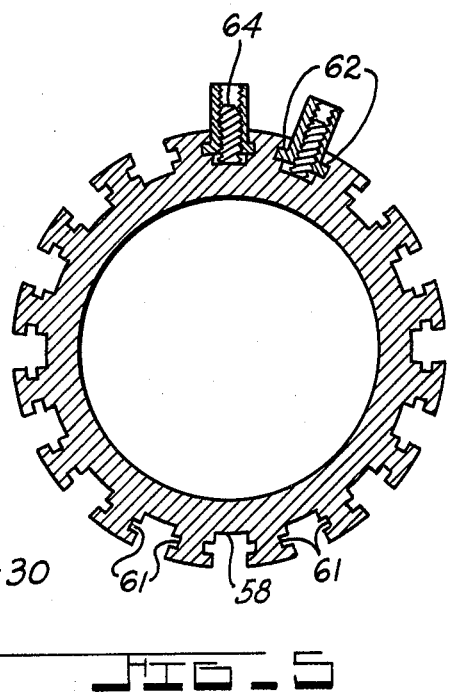
FIGURE 5 represents a sectional view of the present invention taken on line 5—5 of FIGURE 4.

Referring to FIGURE 1, there is shown a conventional upright drill press generally indicated by 22 which is provided with an adjustable headstock 24 adapted to carry a rotatably and axially movable tool carrying spindle 26. A motor 28 mounted on the headstock 24 is suitably connected to the spindle 26 to actuate the same. A spindle operating control panel 30 provided with control means suitably labeled to indicate associated functions thereof is mounted on the headstock 24. A spindle speed control lever 32 suitably connected to the headstock 26 is movable to various positions as indicated to select desired spindle speeds. An adjustable feed rate control member 34 mounted on the headstock 26 may be set to establish the axial feed rate of the spindle as desired.

The drill press 22 is provided with a base 36 which supports a workpiece supporting table 38 suitably mounted thereon for horizontal movement in either of two mutually perpendicular axes X—X and Y—Y beneath the spindle 26.

The table 38 is actuated by motor means, not shown, responsive to the control output of tape reading apparatus generally indicated by 30 which also provides control over the spindle actuating motor 28 in a well-known manner. The construction and operation of the drill press 22 and associated tape reading apparatus 30 is conventional as identified heretofore. Reference is made to technical sales literature readily available from the Giddings and Lewis Company and Bendix Industrial Controls Division for additional details of the Numeri-Mite upright drill press and Dynapoint tape reader, respectively. Further description of the abovementioned conventional apparatus is not believed necessary for a complete understanding of applicant's invention.

Applicant's novel indexable abutment control means includes spaced apart switch means 42 labeled "feed start" and 44 labeled "down stop" which are suitably secured in fixed spaced apart relationship to a support 46 which, in turn, is fixedly secured to headstock 24 by suitable fastening means generally indicated by 48. Alert lights 49 and 51 are suitably wired to switches 42 and 44, respectively, to provide a visual indication of circuit energization and for adjustment purposes as will be described hereinafter. Feed start switch 42 and down stop switch 44 are suitably wired to the electrical control network, not shown, associated with motor 28 to effect the indicated control over the spindle 26. Each switch 42 and 44 is provided with a switch actuating arm 50 having a roller 52 rotatably secured thereto.

The switches 42 and 44 are adapted to be actuated by adjustable abutments 54 and 56, respectively, slidably carried in each of a plurality of spaced apart longitudinally slots or wayes 58 formed in a cylinder or drum 60. Each slot 58 is provided with grooves 61 in the sides thereof which slidably receive mating projections 62 formed on abutments 54 and 56 to thereby slidably retain the abtuments 54 and 56 on cylinder 60. Each of the abutments 54 and 56 has a set screw 64 threadedly engaged therewith which may be turned by an allen wrench or similar tool into engagement with the base of associated slot 58 to thereby lock abutments 54 and 56 in a desired position.

The cylinder 60 is mounted to the spindle 26 for movement there with in an axial direction. To that end, a two-part support bracket 66 suitably mounted to spindle 26 by means including bolts 68 extends through an opening 70 in headstock 24 which opening 70 permits brackets 66 to move up and down relative to the fixed headstock 24. A support arm 72 extends at a right angle to bracket 66 and is fixedly secured to the latter by one or more bolts 74 which extend through brackets 66 into threaded engagement with arms 72. The arm 72 is recessed as at 76 to accommodate an annular bearing member 78 provided with a part spherical bearing surface. A plate 80 having an opening 82 thereto aligned with recess 76 and an opening 84 in arms 72 is fixedly secured to arm 72 by one or more bolts 86 extending therethrough into threaded engagement with arm 72 thereby retaining member 78 in position in recess 76. A circular plate 88 is fixedly secured to the inner wall of cylinder 60 by any suitable means such as a weld and is provided with an integral stub shaft 90 which is aligned with cylinder 60 and extends outwardly therefrom. The shaft 90 is provided with a reduced diameter portion 92 on which is mounted a part spherical bearing member 94 which is held in position against a shoulder 96 on shaft 90 by a retaining member 98 and which slidably rides against mating bearing member 78. A bolt 100 extends through retaining member 98 into threaded engagement with shaft 90 to thereby lock retaining member 98 and bearing member 94 in position on shaft 90. A plate 102 having a plurality of recesses 104 arranged in circular spaced apart pattern on one face thereof is fixedly secured to plate 88 by one or more bolts 106 which extend through plate 102 into threaded engagement with plate 88. The plurality of recesses 104 corresponds to the number of slots 58 on cylinder 60 and each recess 104 is aligned with an associated slot 58. A spring loaded detent 108 suitably mounted in a recess 110 in arm 72 extends therefrom through an opening 112 and plate 80 into engagement with one of the recesses 104 aligned therewith. The periphery of plate 102 is provided with a series of numbers 1 to 16 which are aligned with slots 58 to identify the same.

The upper end of cylinder 60 has an annular support 114 axially aligned therewith and fixedly secured to the inner wall thereof by any suitable means such as a weld. A tubular support 116 carried at one end by annular support 114 is fixedly secured in position thereon by a set screw 118 threadedly engaged with annular member 114 and engageable with tubular support 116. The set screw 118 is reached via an access opening 120 in the base of one of the solts 58. The tubular support 116 is axially aligned with cylinder 60 and extends outwardly therefrom through an opening 122 in a support bracket 124. The bracket 124 is secured to headstock 24 by one or more bolts 125. A part spherical bearing member 126 is bored to slidably receive tubular support 116 and bears against a mating part spherical bearing member 128 which, in turn, is clamped against bracket 124 in axial alignment with opening 122 by an annular retaining member 130 through which one or more bolts 131 extend into threaded engagement with bracket 124. For the purpose of explaining the operation of the above described device, it will be assumed that a work piece is to be processed requiring sixteen machining operations each of which require a different feed start position of spindle 26 and/or down stop position of spindle 26. It will be understood that different tools including various size drills, taps, reamers and the like may be involved for the various machining operations.

The abutments 54 and 56 in slot 58 designated as 1 are adjusted longitudinally along slot 58 in accordance with the desired axial positions of spindle 26 at which change over from fast spindle down traverse to spindle feed and subsequent spindle down stop and reverse action is to occur in accordance with a first predetermined machining operation to be performed by the tool carried by spindle 26 on the work piece carried by table 38. The abovementioned adjsutment of abutments 54 and 56 may be readily carried out by actuating the supporting table 38 and work piece supported thereby to a first programmed position below spindle 26. The appropriate tool for the first machining operation is placed in the chuck of spindle 26. The spindle speed control is set for a slow feed rate. The spindle 26 is set in motion by actuating the appropriate manual control button on control panel 30. As the tool carried by spindle 26 approaches the work piece, the spindle stop button on control panel 30 is actuated to stop the spindle 26 at the position where it is desired to actuate switch 42. The abutment 54 is adjusted downwardly in slot 58 to engage roller 52 of switch 42 thereby tripping switch 42 as indicated by simultaneous lighting of alert light 49. The abutment 54 is locked in position by tightening set screw 64 associated therewith. The supporting table 38 and work piece supported thereby are moved out of the way of the tool carried by spindle 26 which is then actuated downwardly to the desired stop position where the spindle is again stopped by manual actuation of the spindle stop button. The abutment 56 is adjusted downwardly in slot 58 to engage roller 52 of switch 44 thereby tripping switch 44 as indicated by simultaneous lighting of alert light 51. The abutment 56 is locked in position by tightening set screw 64 associated therewith.

The spindle 26 is returned to the up position by manually actuating the appropriate control button on control panel 30. The supporting table 38 and thus the work piece supported thereby are programmed sequentially through the remaining fifteen positions. At each of the remaining fifteen positions, the cylinder 60 is rotated to align a corresponding slot 58 and associated abutments 54 and 56 identified by one of the numbers 2 through 16 on plate 102 with rollers 52 of switches 42 and 44. The abutments 54 and 56 of each solt 58, in turn, are adjusted in the abovementioned manner to initiate the spindle feed rate and subsequent spindle stop action at the proper axial position of spindle 26 corresponding to the requirements of the designated machine operation. After adjustment thereof, each of the abutments 54 and 56 is fixedly secured in position by suitbale turning of the set screw 64 associated therewith.

Now, it will be assumed that the drill press 22 is ready for operation with a work piece to be processed suitably clamped on supporting table 38 which in turn, occupies a first programmed position in response to the tape reader 40. The desired tool for the first machining operation is secured in the chuck of the spindle 26 and cylinder 60 is turned manually to align the slot 58 designated 1 with rollers 52 and switches 42 and 44. With the various spindle control switches on control panel 30 suitably set as indicated, spindle 26 is activated by pressing the cycle start switch thereby initiating fast traverse down movement of the spindle 26. The cylinder 60 being attached to spindle 26 moves downward therewith causing abutment 54 to engage roller 52 of switch 42 thereby actuating the same to effect transfer from fast traverse to feed rate of spindle 26. The spindle 26 continues to move downward at the selected feed rate established by control 34 until abutment 56 engages roller 52 of switch 44 thereby actuating the same to stop spindle 26 and return the same to the up position. The supporting table 38 and thus work piece mounted thereon is automatically actuated to a second predetermined position in response to the control output of the tape reader 40. The cylinder 60 is manually turned to align slot 58 designated as 2 with rollers 52 of switches 42 and 44. The detent 108 engages the corresponding recess 104 to thereby hold the cylinders 60 in the selected rotational position. The second cycle of operation of spindle 26 begins with fast traverse down movement of spindle 26 whereupon abutment 54 of slot 58 designated 2 engages roller 52 of switch 42 to check the fast traverse movement of spindle 26 and change over to the selected feed rate as in the case of the first cycle of operation heretofore described. The spindle 26 continues to move at the selected feed rate until abutment 56 engages roller 52 and switch 44 whereupon the spindle 26 is stopped and automatically returned to the up position.

The supporting table 38 and work piece mounted thereon is automatically positioned in sequence through the remaining 14 predetermined positions in accordance with the programmed output of tape reader 30. For each of the remaining 14 positions the cylinder 60 is manually turned to align the abutments 54 and 56 of the correspondingly numbered slot 58 with the rollers 52 of switches 42 and 44 in the heretofore mentioned manner.

The cylinder 60 may be provided with rings 132 and 134 spaced apart longitudinally thereon and locked in position by associated set screws 136. The rings 132 and 134 serve as stops for abutments 54 and 56 whereby, with spindle 26 in the up position, the abutments 54 and 56 will be held clear of rollers 52 when cylinder 60 is rotated.

While the cylinder 60 is shown with 16 slots 58, it will be recognized that additional slots 58 with abutments 54 and 56 may be provided by utilizing a cylinder 60 of larger diameter.

Also, it will be noted that the cylinder 60 may be readily removed from the support brackets 66 and 124 to permit exchange of cylinders 60 if the capacity of one cylinder 60 is not sufficient. The cylinder 60 may be easily and quickly removed and replaced by removing bolts 74 to release support arm 72 from bracket 66. The cylinder 60 may be tilted to permit withdrawal of tubular support 116 from bearing member 126 and subsequent replacement by a second cylinder 60.

I claim:
1. Indexable control mechanism for a machine tool having an axially and rotatably movable tool carrying spindle and controllable means for actuating the spindle between a forward and a retracted position, said control mechanism comprising:
first and second switch members mounted on a fixed support in fixed spaced apart relationship and operatively connected to the controllable means for controlling the operation of the spindle;
positionable support means including a rotatable cylinder mounted with its axis parallel to the spindle axis and provided with a plurality of longitudinally extending circumferentially spaced apart slots;
first and second abutment means slidably carried in each of said longitudinally extending slots and secured therein in spaced apart relationship;
said rotatable cylinder being rotated to a selected position to align said first and second abutment means of one of said longitudinally extending slots with said first and second switch members to permit actuation of said first and second switch members by said first and second abutment means, respectively, at predetermined axial position of the spindle; and
first and second stop means secured to said rotatable cylinder forward of said first and second abutment means, respectively, and spaced apart a distance not greater than the spacing between said first and second switch means to thereby prevent said first and second abutment means from striking said first and second switch members as said cylinder is rotated when said spindle is in said retracted position.

References Cited

UNITED STATES PATENTS 2,483,712  10/1949  Schafer _____ 77—32.9 XR

FRANCIS S. HUSAR, Primary Examiner

U.S. Cl. X.R.

77—34.5